April 21, 1931.  H. A. DENMIRE  1,801,335
AIR BAG
Filed April 30, 1927
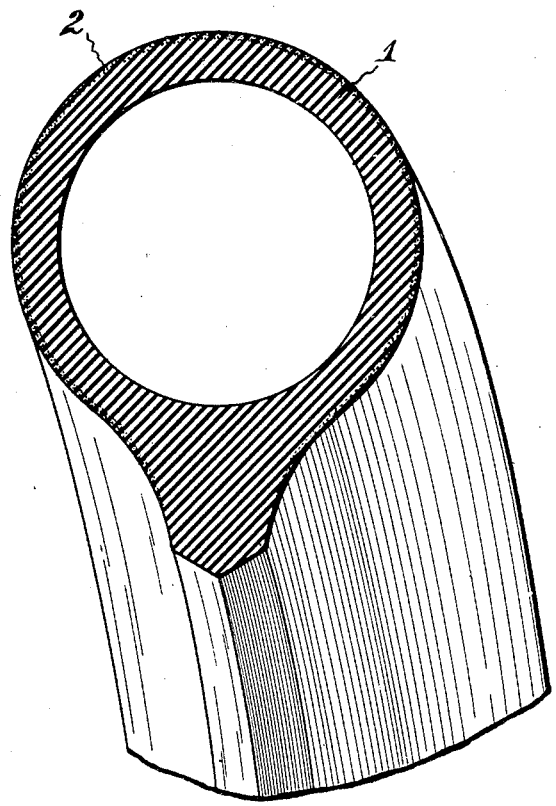
INVENTOR
Harold A. Denmire
BY Evans & McCoy
ATTORNEYS Patented Apr. 21, 1931

1,801,335

UNITED STATES PATENT OFFICE

HAROLD A. DENMIRE, OF AKRON, OHIO, ASSIGNOR TO THE GENERAL TIRE & RUBBER COMPANY, OF AKRON, OHIO, A CORPORATION OF OHIO

AIR BAG

Application filed April 30, 1927. Serial No. 187,713.

This invention relates to air bags for use in vulcanizing pneumatic tire casings and it has for its principal object the provision of an improved form of air bag that is capable of much longer life than air bags heretofore proposed.

Another object of the invention is the provision of an improved method of forming air bags that gives to the bag an improved outer molding surface that retains its flexibility and greatly delays the migration of sulphur or other vulcanizing agent into the bag.

An additional object of the invention is to provide a rubber molding body with a flexible integument having a high metal content for use in the molding of rubber articles.

Another object of the invention is to provide a flexible surface of high metallic content for air bags and like articles used in vulcanization processes.

Heretofore it has been customary to use an air bag until its surface became rough and cracked and to then buff off the surface and resurface the bag. The surface of bags of this character soon became cracked and rough and this produces tire casings in which the interior surface is also rough. When the inside of tire casings becomes so rough as to be objectionable the bag must be resurfaced.

In accordance with the present invention, I contemplate painting the surface of the air bag with a rubber cement that has a high content of metal powder such for instance as aluminum bronze or other similar metal bronze. The body of the cement is preferably, although not necessarily, of the same rubber compound as the body of the air bag.

The single figure of the accompanying drawing shows a transverse section of an air bag embodying the invention. The body 1 of the air bag has a surface layer or skin of a rubber compound 2 that has a high percentage of aluminum bronze powder therein. This surface layer may be applied either before the bag is initially vulcanized and the bag vulcanized after the surface is applied, or the surface may be applied after the bag is vulcanized and the bag then again vulcanized in a heated mold. The body 1 of the bag is of any desired rubber compound.

According to the preferred method of surfacing the bag, a chunk of the uncured rubber compound from which the body of the bag is made up is first digested in gasoline or other suitable solvent. After a rubber cement is made up in this manner, a large quantity of aluminum bronze is thoroughly mixed into the cement. The cement is then applied in one or more coats to the outer face of the uncured air bag and the bag is placed in a mold and vulcanized. The outer surface of the bag may be thoroughly dusted with the bronze powder before vulcanization if desired. This leaves a very smooth outer surface that retains its flexibility and repels, to a degree, adhesion of the tire casing. If the bag is first vulcanized, substantially the same process may be used in applying the protecting surface thereto. It will also be apparent that any desired rubber cement may be used as a binder so long as it permits the incorporation therewith of a high content of metal bronze.

Air bags made in accordance with this invention have been found to be good for many times the number of heats that would destroy the usefulness of a conventional air bag. The surface of the bag is also superior and it produces a much improved casing because of the smooth interior that results.

Although I have described a single application of the invention, other uses thereof will be apparent to those skilled in the art and I desire therefore that only such limitations be applied as are imposed by the prior art.

What I claim is:

1. An air bag for vulcanizing pneumatic tire casings of rubber composition comprising a body of rubber compound and a surface integument vulcanized to the body and having a high percentage of metal bronze incorporated therein.

2. An air bag for use in vulcanizing pneumatic tire casings comprising a body of rubber composition and a surface integument having a relatively high aluminum bronze content carried by a binder of rubber composition vulcanized to the body of the bag.

3. An air bag for use in vulcanizing pneumatic tire casings comprising a body of rubber composition and a surface integument having a molded and vulcanized outer surface embodying a high content of aluminum bronze incorporated with a binder of substantially the same composition as the body of the bag.

4. The method of forming an air bag that comprises forming the body of the bag of uncured rubber stock, painting the surface of the bag with aluminum bronze suspended in a binder of rubber composition, and vulcanizing the bag under heat and pressure in a suitable mold.

5. The method of forming an air bag that comprises forming the body of the bag of uncured rubber stock, painting the surface of the bag with aluminum bronze suspended in a binder of rubber composition, dusting the surface of the bag with an additional quantity of dry aluminum bronze, and vulcanizing the bag under heat and pressure in a suitable mold.

6. A rubber object for applying pressure to other rubber objects being vulcanized comprising a body of rubber composition and a surface integument comprising a high content of aluminum bronze held in a binder of vulcanized rubber.

In testimony whereof I affix my signature.

HAROLD A. DENMIRE.